United States Patent Office 2,820,670
Patented Jan. 21, 1958

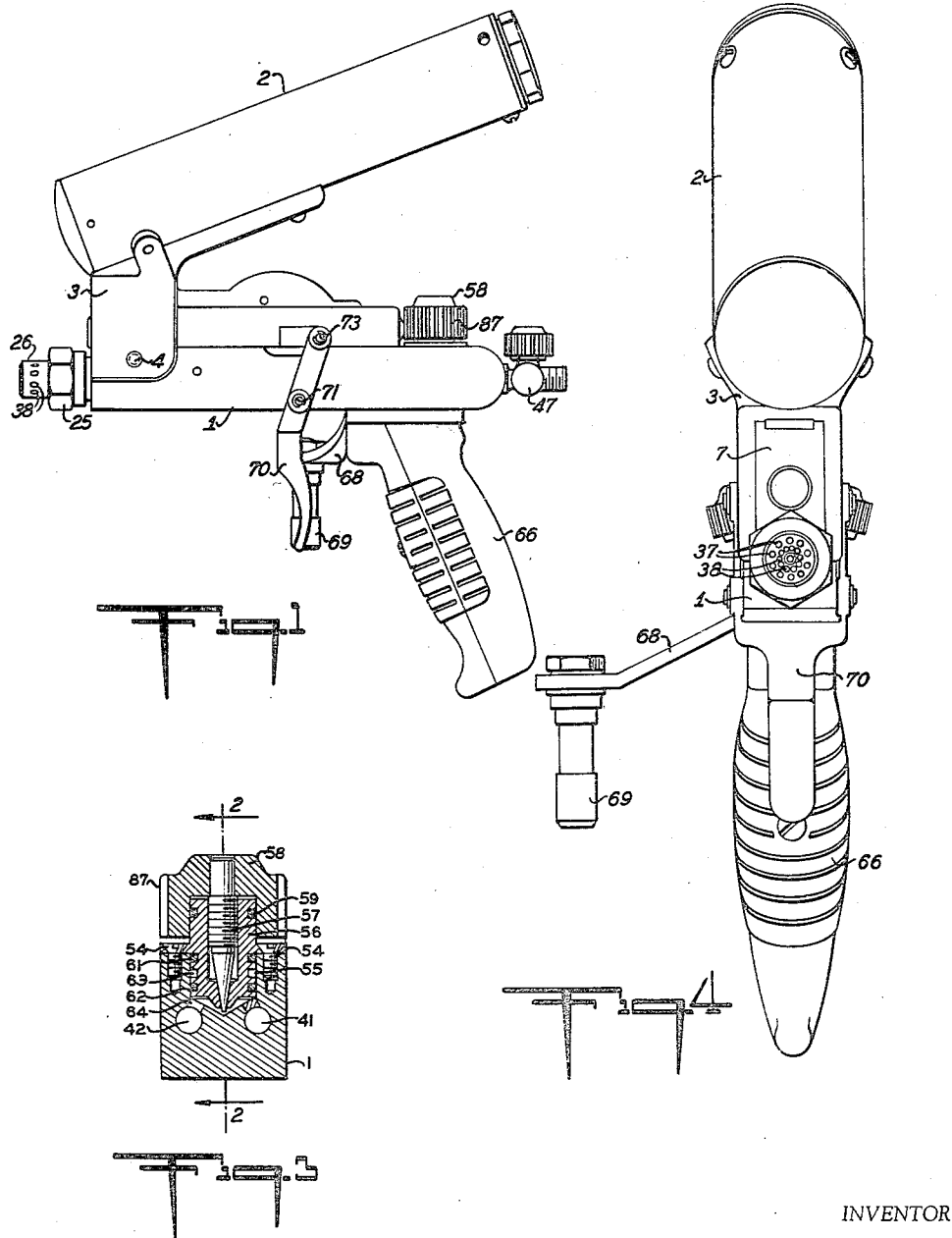

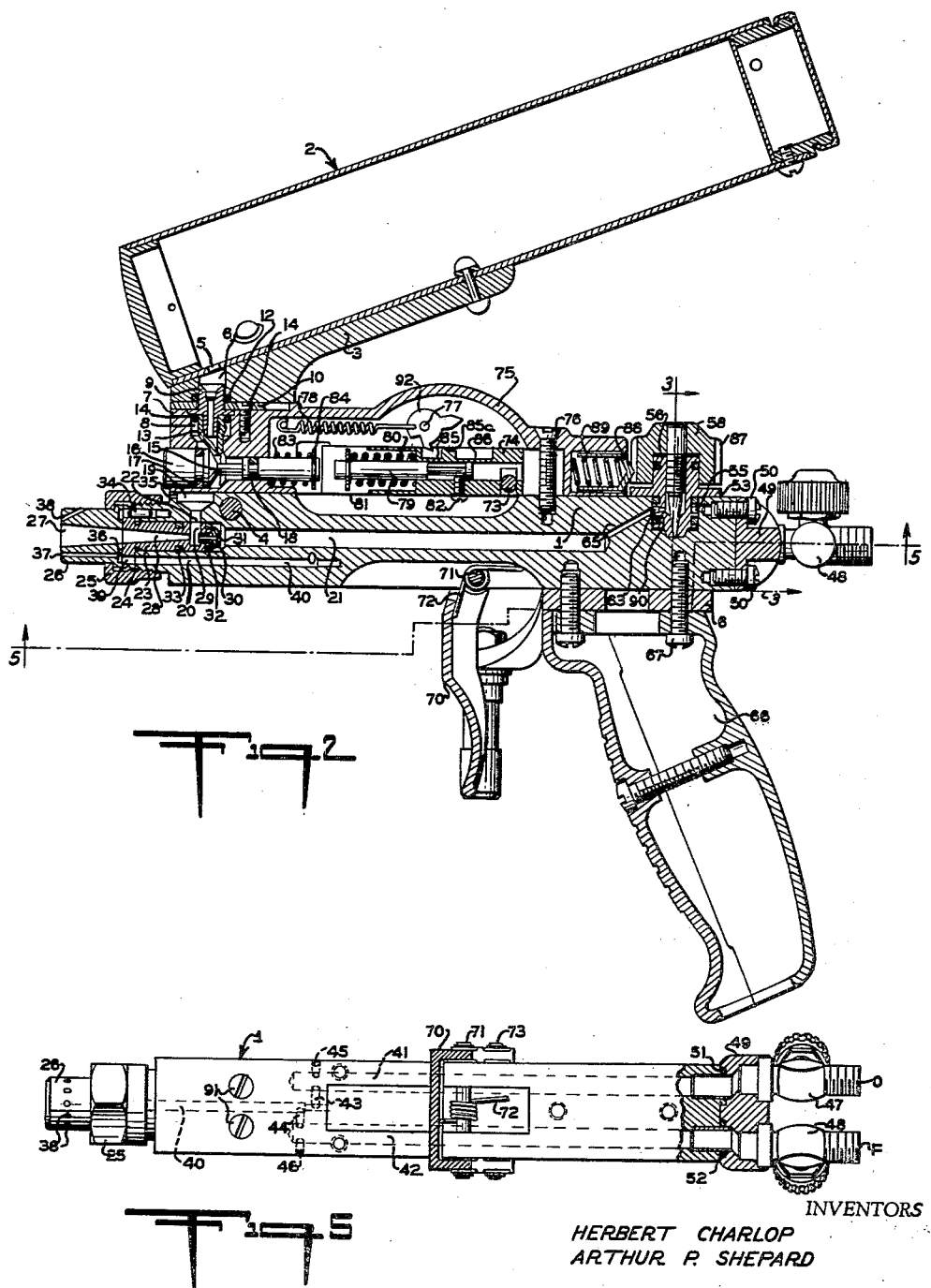

2,820,670

VALVE ARRANGEMENT FOR HEAT-FUSIBLE MATERIAL SPRAY GUNS

Herbert Charlop, Brooklyn, and Arthur P. Shepard, Flushing, N. Y., assignors to Metallizing Engineering Co. Inc., a corporation of New Jersey Application April 13, 1956, Serial No. 578,136

14 Claims. (Cl. 299—28.7)

This invention relates to an improved valve arrangement for heat-fusible material spray guns for spraying heat-fusible materials fed to the gun in divided, such as powdered form.

The invention more particularly relates to an improved valve arrangement for a heat-fusible material spray gun such as a powder type metal spray gun in which finely divided heat-fusible material such as powdered metal or ceramics is gravity fed to a carrier conduit and entrained in this carrier conduit by a small volume of carrier gas and carried by the carrier gas into the gun flame.

The invention, and the objects thereof, will become apparent from the following description read in conjunction with the drawings in which:

Fig. 1 is a side elevation of one embodiment of a heat-fusible material spray gun in accordance with this invention;

Fig. 2 is a vertical-longitudinal section of the embodiment of Fig. 1;

Fig. 3 is a partial cross-section of Fig. 2;

Fig. 4 is a front elevation of the showing in Fig. 1; and

Fig. 5 is a plan view, partially in section, of the underside of Fig. 2.

Referring to the drawings, 1 shows the body of the spray gun, on which is mounted the inclined, tubular material hopper 2. Material hopper 2 is held by a saddle 3 fastened to body 1 by a through-pin 4, which is threaded into saddle 3 at one end to hold it securely in place. The entire hopper 2 with its saddle 3 can be removed for convenience by removing threaded pin 4. A hole 5 is provided in the hopper 2 in communication with the duct 6 in saddle 3. A valve block 7 is securely mounted on top of body 1 and provided with duct 8, which is in line with duct 6. A nipple 9 is mounted between block 7 and saddle 3, so as to connect ducts 6 and 8. The nipple 9 is held in place by a plate 10 and screws 11. A packing washer 12 is provided around nipple 9.

A small piece of rubber tube 13 fits over the lower projecting end of nipple 9 and is held in place by a rubber ring 14. A valve chamber 15 is provided in block 7 and is fitted with a piston 16, having the packed rings 17 and 18.

The piston 16 is operated by a valve-operating mechanism which will be more fully described hereafter.

The body 1 is provided with a powder feed chamber 19, a longitudinal bore 20, extending centrally through the front end of the body, back to and communicating with, a central duct 21 and a hole 22 communicating the powder chamber with the bore 20.

A seat plug 23 in the form of a cylindrical flanged plug is fitted into the bore 20 with a sliding fit, and has a flange extending over the end of body 1. The body 1 is provided with a threaded section 24, onto which is threaded a nut 25. A nozzle 26 is mounted on the flange of seat plug 23 and held in place by nut 25, which simultaneously holds seat plug 23 in place.

The nozzle 26 has a central conical bore 27 which communicates with the central conical bore 28 of seat plug 23 in such a manner that the two form a continuous extended conical bore. A groove 29 is provided in seat plug 23 on the upper half only and communicates bore 28 with hole 22. A jet screw 30 is centrally located in seat plug 23 and is screwed into a central threaded hole in seat plug. The jet screw 30 is provided with a small central jet hole 31 which is concentric with the bore 28 of seat plug 23. Packing rings 32 and 33 are provided to seal seat plug 23 in the bore 20 at both sides of groove 29.

A dowel pin 34 is provided between body 1 and seat plug 23 to hold it in a predetermined position.

A bleeder hole 35 is provided from powder chamber 19 to the front end of body 1. The nozzle 26 is provided with an annular groove at its base 36 and a multiple number of parallel nozzle jet holes 37, arranged in a circle. Nozzle 26 is also provided with air holes 38, which are located alternately between holes 37 and terminate inwardly of holes 37, nearer to bore 27, and extend at a relatively steep angle to the outer surface of nozzle 26.

The seat plug 23 is provided with a hole 39 through its flange, which communicates with annular groove 36. Body 1 is provided with duct 40 which communicates with hole 39. Body 1 is provided with duct 41 for combustion supporting gas and duct 42 for combustible gas. These ducts can be seen by referring to Fig. 5, which also shows more clearly the connecting ducts between ducts 41 and 42 with duct 40.

The connecting duct between 40 and 41 is the connecting duct 43, and the connecting duct between 40 and 42 is the connecting duct 44. These ducts are provided by cross-drilling through body 1 and plugging the outer ends of these ducts with small steel screws at 45 and 46. Valves 47 and 48 are provided and mounted on the rear of body 1 by means of mounting plate 49 and screws 50. These valves are arranged to communicate with ducts 41 and 42 respectively, and these connections are sealed by packings 51 and 52 respectively.

A valve 53 is provided and mounted on body 1 by means of screws 54. The details of this valve construction can best be seen in Fig. 3. A cylindrical bore 55 is provided in body 1 for mounting of this valve. The valve consists of a valve body 56, into which is threaded a needle valve needle 57, on which is secured valve handle 58. Packing ring 59 seals between the inner bore of valve handle 58 and the body 56. Body 56 is provided with a conical seat 60 into which the needle of the needle valve 57 fits. Body 56 is provided with packing rings 61 and 62 which are spaced on each side of a groove 63 on the outer cylindrical surface of body 56. A hole 64 is provided from the bottom of the bore 55 into duct 42 and/or a similar hole may be provided into duct 41.

Referring to Fig. 2, a small duct 65 is provided in body 1 connecting bore 55 with central duct 21 and terminating in bore 55 in direct communication with annular groove 63 in valve body 56. Hole 90 connects annular groove 63 with the bore in valve body 56.

A handle 66 is mounted on body 1 by means of screws 67. Screws 67 also hold mounting bracket 68, which extends to one side of the gun and has stud 69 secure at its terminus. Mounting bracket 68 and stud 69 provide convenient means for mounting the gun when it is not being used by hand.

A trigger 70 is connected through a mechanism, hereinafter to be described, to valve piston 16. Pin 71 in body 1 pivotally supports the trigger 70. Spring 72 holds trigger 70 in a forward position away from handle 66. Trigger 70 extends upward on both sides of the body 1 and at its upper end is mounted a cross pin 73. Cross pin 73 engages a slot in hollow square piston 74. A housing 75 is mounted on body 1 by screw 76 and defines a square piston chamber between itself and the top area of body 1. A cam 92 is mounted on pivot pin 77 in housing 75 and is held in a neutral position, as shown in drawing, by spring 78.

A secondary piston 79 slides in a bore provided in piston cylinder 74, and is held in a forward position by spring 80, which presses against snap ring washer 81, which is fastened to piston 79. A screw 82, which is screwed into the bottom of piston cylinder 74, acts as a limit stop in both directions for secondary piston 79. Valve piston 16 has spring 83 engaging housing 75 at one end and snap ring washer 84 at the other end, so as to hold valve piston 16 in a rearward position.

The top of square piston 74 has a forward cutout section 85 and a rear cutout section 86 on its upper portion. These cutout sections, and the forward and rearward termini thereof, act to engage the cam projections of cam 92, as will be hereinafter more fully described.

Valve handle 58 is provided with milled grooves 87 which engage the pointed end of detent piston 88. Detent piston 88 slides in the space provided for it at the rear of housing 75 and is pressed rearwardly by spring 89.

Trigger 70 operates to open and close a powder feed valve which comprises rubber tube 13 and the piston 16. In the closed position, with the piston 16 in its rearward position, the piston squeezes the end of rubber tube 13 closed. This position is shown in Fig. 2. When piston 16 is moved to a forward position, it releases the squeezing pressure on the end of rubber tube 13, opening it and permitting powder to flow through the rubber tube.

In the open position of rubber tube 13, powder is permitted to flow by gravity from hopper 2 through hole 5, duct 6, the passage in nipple 9, through rubber tube 13, through valve chamber 15 and into powder chamber 19.

When trigger 70 is pulled rearwardly toward the handle 66, pin 73 is moved in a forward direction, causing cylinder piston 74 to move in a forward direction, carrying with it secondary piston 79, which also therefore moves forward. Piston 79 engages and also pushes forward valve piston 16 and hence opens the valve. When valve piston 16 is all the way forward, at the limit of its stroke, piston cylinder 74 continues to move forward. This additional movement is permitted since after secondary piston 79 stops moving forward, spring 80 is compressed. During the forward movement of cylinder piston 74, the rearward terminus of cutout section 85 engages the lower projection of cam 92 and rotates it clockwise until the rearward projection of cam 92 engages the rear terminus of cutout section 86 of piston cylinder 74. This stops the forward motion of the piston cylinder 74, and at this point the lower projection of the cam 92 is positioned just above the groove 85a in the partition separating the cutouts 85 and 86. As the trigger 70 is released, the piston cylinder 74 is urged rearwardly by the spring 80. It, however, can only move a very short distance rearwardly before it is stopped by the engagement of the lower projection of the cam 92 in the groove 85a, preventing further rearward movement. The valve therefore remains in a locked, open position even after the trigger 70 is released.

To release the valve the operator simply again squeezes the trigger 70 toward the handle 66 a second time. This causes forward motion of the piston cylinder 74, with the lower projection of the cam 92 sliding out of the open rearward end of the groove 85a into the cutout section 86. The lower projection of the cam 92 is already past the highest point on the partition separating the cutouts 85 and 86, so that the rearward terminus of the cutout section 85 will not rotate the cam to a position where its rear projection will stop the forward motion of the piston cylinder 74 by contacting the rearward terminus of the cutout section 86. The operator then releases the trigger and the cylinder piston 74 and the trigger 70 will return all the way to the original position as shown in Fig. 2. The rearward motion of the piston cylinder 74 will merely cause the cam 92 to rotate in a counter-clockwise direction when the lower projection strikes the partition separating the cutouts 85 and 86, and after riding over this projection the spring 78 will cause the cam to snap back with its lower projection in the cutout 85. The spring 80 will act to push the cylinder piston 74 rearwardly only until the secondary piston 79 disengages the piston valve 16. Thereafter the rearward motion is caused by the action of the spring 72, which urges the trigger 70 forward and thus the pin 73 rearwardly.

The trigger and powder valve mechanism thereby permits the operator to open the valve by pulling a trigger a first time, and the valve will remain open even after the trigger is released. The valve is closed by pulling the trigger a second time and then releasing it.

In operation, the powdered material to be sprayed is placed in hopper 2, and fuel gas and combustion supporting gas hoses are connected in the conventional manner to valves 48 and 47 respectively. Sources of fuel gas and their hoses and fittings are not shown, since these are conventional and well known for use with such equipment. With the powder valve just described, closed, and the powder feed valve 53 closed, the gun is first lighted by slightly opening valves 48 and 47 and lighting the gases as they emerge from nozzle jets 37.

The fuel gas flows through valve 48, into and through conduit 42, through connecting conduit 44 and into conduit 40. The combustion supporting gas flows through valve 47 and into and through conduit 41, through connecting conduit 43 and also into conduit 40, where it mixes with the fuel gas. The mixed gases flow from conduit 40 through hole 39 and into annular groove 36, and from thence through multiple nozzle jets 37 where they are ignited upon emergence.

The discharge of the gases from nozzle jets 37 causes reduced pressure at the face of nozzle 26, which causes objectionable turbulence at the face of the nozzle, which in turn tends to cause deposit of fusible material on the face of the nozzle. When the nozzle is lighted, however, the reduced pressure at the face of the nozzle is substantially relieved by the induced flow of a small amount of atmospheric air through holes 38, which terminate at the face of the nozzle in alternate positions between nozzle jet holes 37. While the flow of air through holes 38 is very small, it is sufficient to completely eliminate the tendency for material to collect and build up on the face of nozzle 26.

To start the powder flow, valve 53 is first adjusted. The detent piston 88, engaging the grooves 87 in valve handle 58, provides a convenient means for determining the setting of the valve by counting the number of clicks from a fully closed position. The detent also securely holds the valve in a predetermined position. When valve 53 is open, a small amount of fuel gas flows from conduit 42 through hole 64, through the valve 53, and past needle 60, into the bore of valve body 56, through hole 90, into annular chamber 63, and from thence through conduit 65 into central duct 21. From central duct 21 a very small amount of gas is permitted to flow through jet hole 31 in jet screw 30. This jet of fuel gas extends across groove 29 and exhausts out through powder conduits 28 and 27 to the center of the flame.

To start the powder feeding, the operator pulls back on trigger 70, which opens the powder feed valve as hereinabove described. The powder then flows from powder chamber 19 into groove 29, where it is picked up by the jet of fuel gas emerging from jet hole 31. The powder is then carried forward through conduits 28 and 27 and emerges at the nozzle face in the center of the flame.

Hole 35 is provided into powder chamber 19 to maintain atmospheric pressure in said chamber. This is of importance since otherwise a partial vacuum is created by the action of jet 31, which varies with the flow of powder and hence causes an excessive variation in the powder feed. Most metal powders feed satisfactorily by gravity from hopper 2 down through the various passages to powder chamber 19 and groove 29. The hopper 2 has been mounted at an angle so that the material feeds satisfactorily for all positions of the gun through 90° from horizontal to practically vertically down.

Some powders, however, due to their configuration, size and other properties, do not feed as readily as other powdered materials. In cases where the powders tend to pack or feed unevenly, it is advisable to shake or vibrate the gun slightly. An extremely small amount of vibration or shaking is required to cause smooth flowing of even those powders with the worst flowing characteristics. For this purpose, and when needed, a small vibrator, for instance an electric vibrator such as an electric buzzer, is attached to the bottom of the gun body, such as by screws 91. Such vibrators are well known in the art and hence this construction has not been shown in the drawings, nor is the vibrator described in detail.

While the hopper 2 may be made of any suitable structure and material, it is an advantage to make it of clear plastic material so that the operator can see the amount of powder remaining in the hopper.

In place of the hopper 12 a separate, as for example, a larger capacity hopper may be supported above the gun and connected to the duct 6 by means of a flexible hose, as for example a flexible rubber hose. The powdered heat-fusible material in the hopper, which is for example suspended from the ceiling, will feed through the flexible hose by gravity into the duct 6. This construction relieves the operator of the strain of holding the weight of the heat-fusible material and allows the use of a much larger capacity container. With such an arrangement the gun may be operated between a position pointing almost vertically down to a position pointing almost vertically up.

As may be seen from the foregoing, the invention essentially comprises regulating valve means for controlling the flow of a carrier gas through a carrier gas feed conduit and independent shut-off valve means for interrupting the flow of divided heat-fusible material to a carrier conduit in a heat-fusible material spray gun of the type having a nozzle means, means for passing a combustible and a combustion supporting fluid through said nozzle means for flame combustion, a carrier conduit positioned for directing material passing therethrough into the flame produced upon combustion of fluids passing through said nozzle means, a gravity flow duct for gravity feeding finely divided heat-fusible material to the carrier conduit and a carrier gas feed conduit for the passage of a carrier gas therethrough into the carrier conduit to entrain and carry divided heat-fusible material through the carrier conduit to the flame. This arrangement, in the normal use of the gun, allows the operator to instantly start and stop the flow of the divided heat-fusible material, such as the powder, independently of the flame, without upseting the flame adjustment. This is of advantage since in the normal use of the gun, the operator is frequently required to interrupt and again commence the spraying of the powder. Thus for example the operator may wish to pre-heat the surface being sprayed as a first step, spray material onto the surface as a second step, and he may thereafter, as a third step, wish to heat the coating after spraying has been stopped to fuse the coating.

The shut-off valve means, in accordance with the invention, is preferably in the form of a flexible, resilient tube with a movable member for squeezing the tube shut and for releasing the tube. This valve is of a very simple and economic construction and yet is completely reliable and practically foolproof in operation as contrasted to conventional valves such as tapered valves, stop cocks, etc. which are not satisfactory for the handling of solid material in subdivided form since the particles of such material interfere with the valve action.

The trigger mechanism provided for controlling the shut-off valves preferably has catch means so that, upon a first actuation of the trigger, the shut-off valve will be maintained in an open position even upon release of the trigger and will not be again actuated to a shut position except on a second actuation of the trigger. This allows the gun to be mounted on a suitable support for the spraying operation without requiring the operator to maintain the trigger in a depressed position. Furthermore, with this catch mechanism there is little chance that the operator might accidentally interrupt or diminish the supply of powder fed during the spraying operation which might otherwise occur, particularly when the operator is required to hold the gun for a long period of time.

The regulating valve means for controlling the flow of the carrier gas is preferably a detent valve means so that the same will not accidentally be knocked out of a pre-determined optimum adjustment and in accordance with the most preferred construction, the adjustment of the same may be readily determined as, for example, by a series of audible clicks so that the operator, after determining the optimum setting of a particular type of spraying operation, may readily again find this adjustment without further experimentation.

While the invention has been described in detail with reference to the specific embodiments shown, various changes and modifications will become apparent to the skilled artisan which fall within the spirit of the invention and scope of the appended claims.

We claim:

1. A trigger mechanism comprising a trigger, actuation means connected to said trigger for axial movement upon movement of the trigger, a first cut-out and a second cut-out defined in said actuation means, said cut-outs being separated by a partition defining a shoulder, a cam rotatably mounted adjacent said actuation means and having a first projection extending into said first cut-out and a second projection extending in the direction of said second cut-out, means resiliently biasing said cam in said position, said projection, partition, shoulder and cut-outs being dimensioned so that upon motion of said actuation means in the direction from said second cut-out toward said first cut-out, upon a first actuation of said trigger, said partition contacts said first projection rotating said cam until said second projection contacts a side wall of said second cut-out preventing further motion in said direction with said first projection positioned adjacent said shoulder, whereby upon starting reverse motion of said actuation means said first projection locks against said shoulder preventing further motion in said reverse direction and a second actuation of said trigger will release said first projection into said second cut-out allowing reverse motion of said actuation means.

2. In a heat-fusible material spray gun having nozzle means, means for passing a combustible and a combustion supporting fluid through said nozzle means for flame combustion, a carrier conduit positioned for directing material passing therethrough into a flame produced upon combustion of the fluids passing through said nozzle means, a gravity flow duct for gravity feeding finely divided heat-fusible material to said carrier conduit and a carrier gas feed conduit for the passage of a carrier gas therethrough into the carrier conduit to entrain and carry divided heat-fusible material through the carrier conduit to the flame, the improvement which comprises regulating valve means for controlling the flow of carrier gas through said carrier gas feed conduit and independent shut-off valve means for interrupting the flow of divided heat-fusible material to said carrier conduit, including a valve chamber, a flexible resilient tube forming a portion of said gravity flow duct extending into said valve chamber, a piston axially movable in said valve chamber between a position squeezing the end of said tube shut against the chamber wall and a position releasing said tube.

3. Improvement according to claim 2 including spring means resiliently biasing said piston in a direction squeezing said tube shut, a trigger and catch means controlled by said trigger for releasably maintaining said piston in a position releasing said tube upon first actuation of said trigger and releasing said piston to squeeze said tube upon a second actuation of said trigger.

4. Improvement according to claim 3 including a piston cylinder arrangement connected to said trigger, means for forward axial movement to a position pressing said piston means against said spring means to a position releasing said tube upon rearward movement of said trigger and for rearward axial movement allowing said piston to move to a position squeezing said tube upon forward motion of said trigger means, spring means for biasing said piston cylinder arrangement in a rearward direction, said catch means including a forward cut-out and a rear cut-out defined in said piston cylinder arrangement, said cut-outs being separated by a grooved partition, a cam rotatably mounted adjacent said piston cylinder arrangement and having a first projection extending into said forward cut-out with said trigger means in its forward position and a second rearwardly extending projection, spring means resiliently biasing said cam in said position, said projections, grooved partition and cut-outs being dimensioned so that upon forward motion of said piston cylinder arrangement said partition contacts said first projection rotating said cam until said second projection contacts the rear terminus of said rear cut-out, preventing further forward motion with said first projection positioned adjacent the groove in said partition, whereby upon release of said trigger means rearward motion of said piston cylinder arrangement locks said first projection in said groove, maintaining said piston in said position releasing said tube and a second rearward motion of said trigger means will release said first projection into said rear cut-out allowing rearward motion of said piston cylinder arrangement upon release of said trigger means.

5. Improvement according to claim 4 in which said piston cylinder arrangement includes a second piston extending from the forward end thereof for actuating contact with said first mentioned piston, said second piston being mounted in said piston cylinder arrangement for limited axial movement between an extended and retracted position and including spring means biasing said second piston to its extended position.

6. Improvement according to claim 5 in which said regulating valve means comprises detent valve means.

7. Improvement according to claim 6 in which said regulating valve means includes an adjustment handle having a multiple number of axially extending grooves positioned around its periphery and a detent piston resiliently urged in contact with said adjustment handle for clicking engagement with said grooves.

8. Improvement according to claim 7 in which said regulating valve means comprises needle valve means removably mounted in the gun body for removal as a unit.

9. Improvement according to claim 2 in which said regulating valve means comprises detent valve means.

10. Improvement according to claim 9 in which said regulating valve means includes an adjustable handle having a multiple number of axially extending grooves positioned around its periphery and a detent piston resiliently urged in contact with said adjustment handle for clicking engagement with said grooves.

11. Improvement according to claim 10 in which said regulating valve means comprises needle valve means removably mounted in the gun body for removal as a unit.

12. In a heat-fusible material spray gun having a gravity flow duct for gravity feeding finely divided heat-fusible material, a valve for interrupting the flow of material through said gravity flow duct comprising a flexible resilient tube forming a portion of said gravity flow duct, a valve chamber, the end of said tube extending into said valve chamber, and including a piston axially movable in said chamber between a position squeezing the end of said tube shut against the valve chamber wall and a position releasing said tube.

13. Improvement according to claim 12 including spring means resiliently biasing said piston in a direction squeezing said tube shut, a trigger and catch means for releasably maintaining said piston in said position releasing said tube upon first actuation of said trigger and releasing said piston to squeeze said tube upon second actuation of said trigger.

14. Improvement according to claim 13 including a piston cylinder arrangement connected to said trigger means for forward axial movement to a position pressing said piston means against said spring means to said position releasing said tube upon rearward movement of said trigger means and for rearward axial movement allowing said piston to move to said position squeezing said tube upon forward motion of said trigger means, spring means for biasing said piston cylinder arrangement in a rearward direction, said catch means including a forward cut-out and a rear cut-out defined in said piston cylinder arrangement, said cut-outs being separated by a grooved partition, a cam rotatably mounted adjacent said piston cylinder arrangement and having a first projection extending into said forward cut-out with said trigger means in its forward position, and a second rearwardly extending projection, spring means resiliently biasing said cam in said position, said projections, grooved partition and cut-outs being dimensioned so that, upon forward motion of said piston cylinder arrangement, said partition contacts said first projection, rotating said cam until said second projection contacts the rear terminus of said rear cut-out preventing further forward motion with said first projection positioned adjacent the groove in said partition, whereby upon release of said trigger means rearward motion of said piston cylinder arrangement locks said first projection in said groove, maintaining said piston in said position releasing said tube and a second rearward motion of said trigger means will release said first projection into said rear cut-out allowing rearward motion of said piston cylinder arrangement upon release of said trigger means.

References Cited in the file of this patent

UNITED STATES PATENTS

| | | |
|---|---|---|
| 797,922 | Sherman | Aug. 22, 1905 |
| 1,919,602 | Stewart | July 25, 1933 |
| 2,671,689 | Watt | Mar. 9, 1954 |
| 2,726,118 | Jones et al. | Dec. 6, 1955 |

FOREIGN PATENTS

| | | |
|---|---|---|
| 627,108 | Great Britain | July 28, 1949 |
| 707,228 | Great Britain | Apr. 14, 1954 |